United States Patent
Karandikar et al.

(10) Patent No.: US 10,884,991 B1
(45) Date of Patent: Jan. 5, 2021

(54) DATA REQUEST ANALYSIS AND FULFILLMENT SYSTEM AND METHOD

(71) Applicant: JPMorgan Chase Bank, N.A., New York, NY (US)

(72) Inventors: Anant N. Karandikar, Palatine, IL (US); Uma Atluri, New City, NY (US); Mohamed Ahmed Nouh, New York, NY (US); Lakshmikanthan Venkataraman, Woodbridge, NJ (US); Ludwig A. D'Angelo, Staten Island, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1055 days.

(21) Appl. No.: 14/656,761

(22) Filed: Mar. 13, 2015

Related U.S. Application Data

(60) Provisional application No. 61/953,242, filed on Mar. 14, 2014.

(51) Int. Cl.
*G06F 16/174* (2019.01)
*G06Q 10/06* (2012.01)
(Continued)

(52) U.S. Cl.
CPC ........ *G06F 16/1756* (2019.01); *G06F 16/178* (2019.01); *G06F 21/105* (2013.01);
(Continued)

(58) Field of Classification Search
CPC ........... G06F 17/3089; G06F 17/30899; G06F 17/30368; G06F 17/30371;
(Continued)

(56) References Cited

U.S. PATENT DOCUMENTS

| | | | | | |
|---|---|---|---|---|---|
| 5,473,772 | A | * | 12/1995 | Halliwell | G06F 8/60 717/171 |
| 6,615,166 | B1 | * | 9/2003 | Guheen | G06Q 10/06 703/26 |

(Continued)

OTHER PUBLICATIONS

Ballard et al. "IBM solidDB Delivering Data with Extreme Speed", IBM Redbooks, May 2011, ibm.com/redbooks (Year: 2011).*

*Primary Examiner* — Christine M Behncke
*Assistant Examiner* — Shelby A Turner
(74) *Attorney, Agent, or Firm* — Greenblum & Bernstein, P.L.C.

(57) ABSTRACT

A system and method is provided for analyzing and fulfilling file requests within an organization, the file requests including multiple data items. The system and method includes storing delivered data items in at least one computer memory and executing instructions using at least one computer processor to perform multiple steps. The file request may be received over a network from a system user and analyzed to identify data items corresponding to the delivered data items. The request may then be cleansed by creating a delta list removing the data items corresponding to the delivered data items. The cleansed request may be transmitted for fulfillment to a fulfillment source. When a file corresponding to the fulfilled request is received, a response file combining the file corresponding to the received request with the data items corresponding to the delivered data items is created.

19 Claims, 6 Drawing Sheets

(51) Int. Cl.
*G06F 16/178* (2019.01)
*G06Q 20/12* (2012.01)
*G06Q 20/14* (2012.01)
*G06F 21/10* (2013.01)

(52) U.S. Cl.
CPC ..... *G06Q 10/0637* (2013.01); *G06Q 20/1235* (2013.01); *G06Q 20/145* (2013.01); *Y10S 705/902* (2013.01); *Y10S 705/909* (2013.01)

(58) Field of Classification Search
CPC ......... G06F 17/30569; G06F 17/30595; G06F 17/30864; G06F 2221/0782; G06F 15/16; G06F 2009/45575; G06F 21/105; G06F 16/1756; G06F 16/178; G06Q 10/0637; G06Q 10/0639; G06Q 10/00; G06Q 30/02; G06Q 99/00; G06Q 10/06361; G06Q 10/06312; G06Q 2220/18; G06Q 2220/12; G06Q 2220/10; G06Q 20/145; G06Q 20/1235; G06Q 10/06; G06Q 10/063; H04L 43/045; H04Q 2213/13349
USPC ...... 705/7.11, 7.28, 7.37, 51, 7.12, 26.2, 38; 707/695, 780; 709/217, 222, 229; 717/171; 726/18, 26
See application file for complete search history.

(56) References Cited

U.S. PATENT DOCUMENTS

| | | | | |
|---|---|---|---|---|
| 6,978,381 B1* | 12/2005 | Te | G06F 21/604 | 705/54 |
| 7,689,510 B2* | 3/2010 | Lamkin | G06F 17/30041 | 705/51 |
| 7,870,075 B1* | 1/2011 | Sabet | G06F 21/105 | 705/52 |
| 8,650,283 B1* | 2/2014 | Chang | H04N 21/632 | 709/224 |
| 8,688,507 B2* | 4/2014 | Kennis | G06F 17/30569 | 705/38 |
| 8,762,191 B2* | 6/2014 | Lawrence | G06Q 40/08 | 705/7.28 |
| 9,203,911 B2* | 12/2015 | Krishnaswamy | G06Q 30/02 | |
| 9,418,381 B2* | 8/2016 | Ahuja | G06Q 40/02 | |
| 2001/0011253 A1* | 8/2001 | Coley | G06F 21/10 | 705/59 |
| 2001/0044781 A1* | 11/2001 | Shutes | G06Q 10/06 | 705/59 |
| 2003/0004882 A1* | 1/2003 | Holler | G06F 21/121 | 705/51 |
| 2003/0083995 A1* | 5/2003 | Ramachandran | G06Q 30/06 | 705/52 |
| 2004/0010440 A1* | 1/2004 | Lenard | G06F 21/105 | 705/59 |
| 2004/0024688 A1* | 2/2004 | Bi | G06Q 40/04 | 705/37 |
| 2004/0044731 A1* | 3/2004 | Chen | H04L 67/2842 | 709/203 |
| 2007/0061487 A1* | 3/2007 | Moore | G06F 16/27 | 709/246 |
| 2008/0010372 A1* | 1/2008 | Khedouri | G06F 16/1834 | 709/224 |
| 2009/0228984 A1* | 9/2009 | Sterin | G06Q 10/0637 | 726/26 |
| 2010/0205458 A1* | 8/2010 | O'Connell, Jr. | H04L 67/28 | 713/189 |
| 2010/0332401 A1* | 12/2010 | Prahlad | H04L 67/1095 | 705/80 |
| 2011/0113057 A1* | 5/2011 | Lee | G06Q 50/01 | 707/769 |
| 2012/0173353 A1* | 7/2012 | Rausch | G06Q 30/0601 | 705/26.1 |
| 2012/0191804 A1* | 7/2012 | Wright | G06F 16/9574 | 709/217 |
| 2014/0012867 A1* | 1/2014 | Moss | G06N 3/02 | 707/756 |
| 2014/0283108 A1* | 9/2014 | Torgerson | G06F 21/10 | 726/27 |
| 2015/0026825 A1* | 1/2015 | Dube | G06F 3/04855 | 726/28 |

* cited by examiner

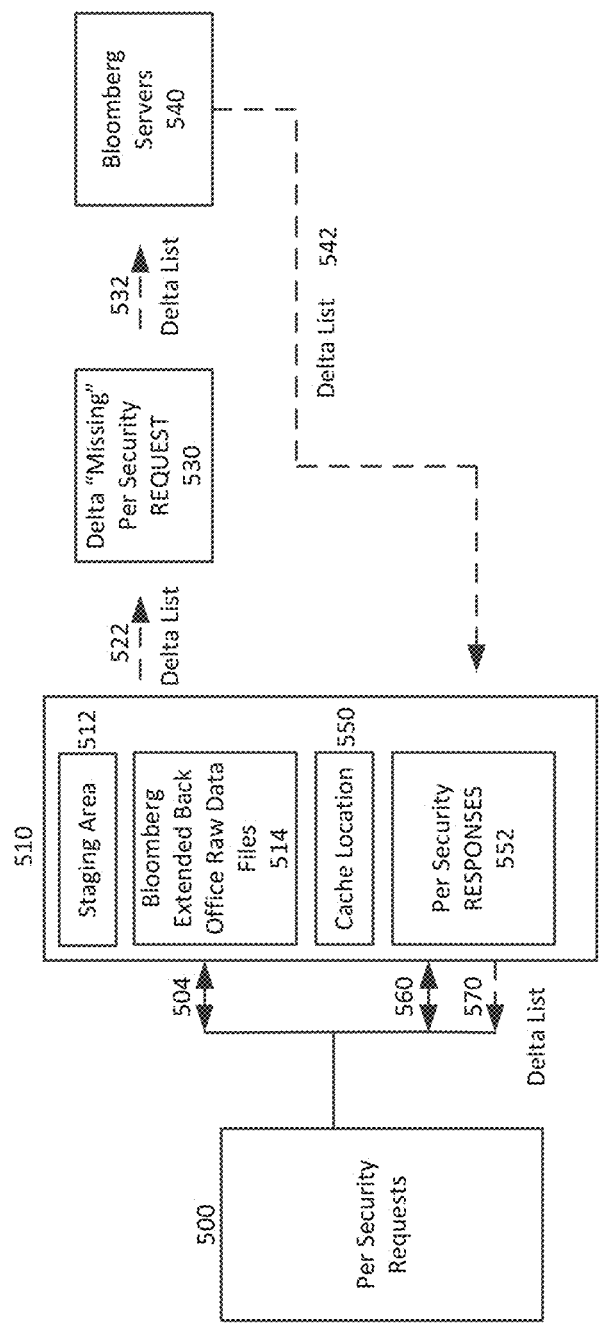

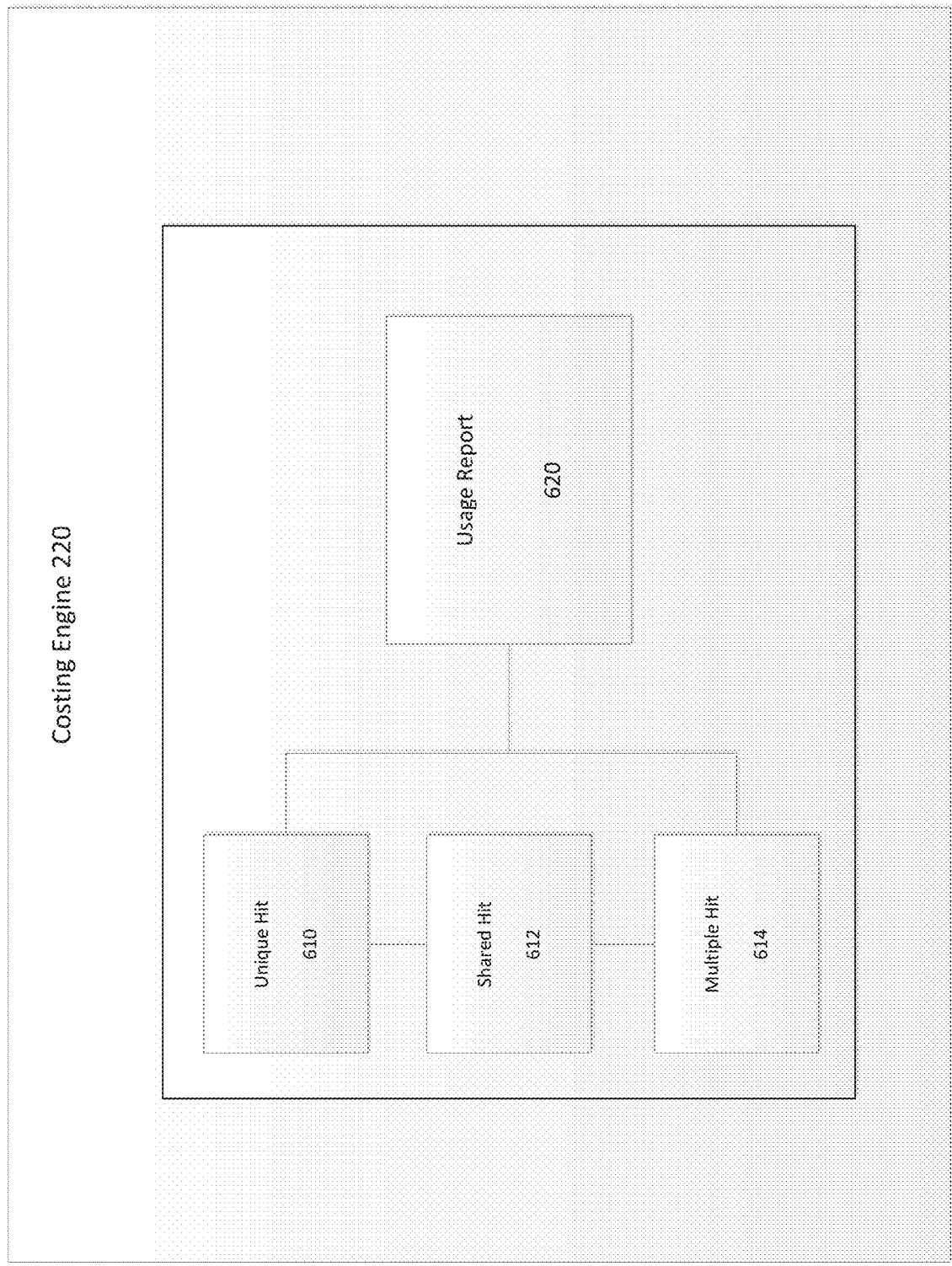

DATA REQUEST ANALYSIS AND FULFILLMENT SYSTEM AND METHOD

CROSS REFERENCE TO RELATED APPLICATIONS

This patent application claims priority to U.S. Provisional Application No. 61/953,242, filed Mar. 14, 2014.

FIELD OF THE INVENTION

Embodiments of the invention relate generally to the field of data request analysis and fulfillment. More particularly, embodiments of the invention relate to retrieval of financial data, such as Bloomberg™ data in a cost effective and efficient manner.

BACKGROUND

Large organizations with many employees typically provide a system for fulfillment of data requests that is available to users within the organization. While some data requests are easily accommodated, other data can be expensive and duplicative requests for the data can result in unnecessary expense for the organization. In financial institutions, Bloomberg™ data is typically sought by employees for pricing information and reference data elements. While financial organizations typically provide a Bloomberg™ terminal at significant expense through which all Bloomberg™ data is accessible, this data is not accessible in bulk format.

To obtain Bloomberg™ data in bulk format, organizations can obtain a license to receive periodic delivery of back office files, either in extended or in basic format. The periodic delivery typically occurs daily at a predetermined time. The back office files are delivered by asset class. The extended back office files are organized in the same manner, but may include additional attributes not found in the basic back office files. While this method offers bulk delivery, neither the basic nor the extended back office files provide all of the data available through the Bloomberg™ terminal.

In order to obtain this additional data that is unavailable through the back office files, users purchase a per security data license to access Bloomberg™ data. The per security data license enables users to make individual data requests. Users specify the instruments and attributes needed and transmit the request to Bloomberg™. The Bloomberg™ system returns a file transfer protocol (FTP) file with the requested data items within minutes. Each item of data requested based on the per security licenses incurs additional cost. The cost of the per security capability exceeds the cost of obtaining the back office files and the purchase of duplicative data becomes expensive.

Because of the time involved in searching back office files, users with substantial data requests will typically submit their requests to the system based on the per security data license. Regardless of whether the data items requested are contained in the back office files that the organization has already purchased, the organization will pay additional costs to obtain the data items through the per security license. For example, when a user requests ten items through the per security data service, the user will pay for all ten items, even if four of those items are already contained in the back office files purchased by the organization.

Accordingly, users not only request, but also purchase, duplicative data on behalf of the organization. This process is both time consuming and cost-prohibitive. Accordingly, a solution is needed that will optimize the use of existing data, reduce ancillary requests, and realize cost savings.

SUMMARY

In one aspect, the invention includes a method for analyzing and fulfilling a file request within an organization using a data request analysis and fulfillment system, the file request including multiple data items. The method comprises storing delivered data items in at least one computer memory and executing instructions using at least one computer processor for performing steps including: receiving the file request over a network from a system user; analyzing the file request to identify data items corresponding to the delivered data items; creating a delta list by removing the data items corresponding to the delivered data items from the file request; generating a modified request based on the delta list; transmitting the modified request for fulfillment to a fulfillment source; receiving a file corresponding to the fulfilled request; creating a response file combining the file corresponding to the received request with the data items corresponding to the delivered data items; and transmitting the response file to the system user.

In an additional aspect, the invention includes a system for analyzing and fulfilling a file request within an organization, the file request including multiple data items. The system comprises delivered data items stored on at least one computer memory; at least one computer processor for receiving the file request over a network from a system user and analyzing the file request to identify data items corresponding to the delivered data items; an optimization engine for cleansing the request by creating a delta list removing the data items corresponding to the delivered data items; and a network for transmitting the cleansed request for fulfillment to a fulfillment source. Upon receiving a file corresponding to the fulfilled request, the at least one computer processor is operable to create a response file combining the file corresponding to the received request with the data items corresponding to the delivered data items.

In yet an additional aspect, a method is provided for sharing costs of fulfilling a file request within an organization, the file request including multiple data items. The method comprises storing delivered data items in at least one shared computer memory and executing instructions using at least one computer processor for performing steps including: receiving the file request over a network from a first system user associated with a first level of the organization; analyzing the file request to identify data items corresponding to the delivered data items; generating a usage report to determine whether a second system user from a second level of the organization has made an overlapping request; creating a delta list by removing the data items corresponding to the delivered data items from the file request; generating a modified request based on the delta list; transmitting the modified request for fulfillment to a fulfillment source; receiving a file corresponding to the fulfilled request; creating a response file combining the file corresponding to the received request with the data items corresponding to the delivered data items; transmitting the response file to the first system user; transmitting the response file to the second system user; and dividing any cost associated with the response file between the first and second levels of the organization.

BRIEF DESCRIPTION OF THE DRAWINGS

The present invention is described in detail below with reference to the attached drawings:

FIG. 5 is a work flow diagram illustrating movement of a data request in accordance with an embodiment of the invention; and FIG. 6 is a block diagram illustrating generation of a cost report in accordance with an embodiment of the invention.

DETAILED DESCRIPTION OF PREFERRED EMBODIMENTS

Embodiments of the invention optimize usage of a cost per request source data system by utilizing existing data received through other channels to their maximum benefit, reducing the number of data items contained in requests and realizing cost savings.

Figure 1:
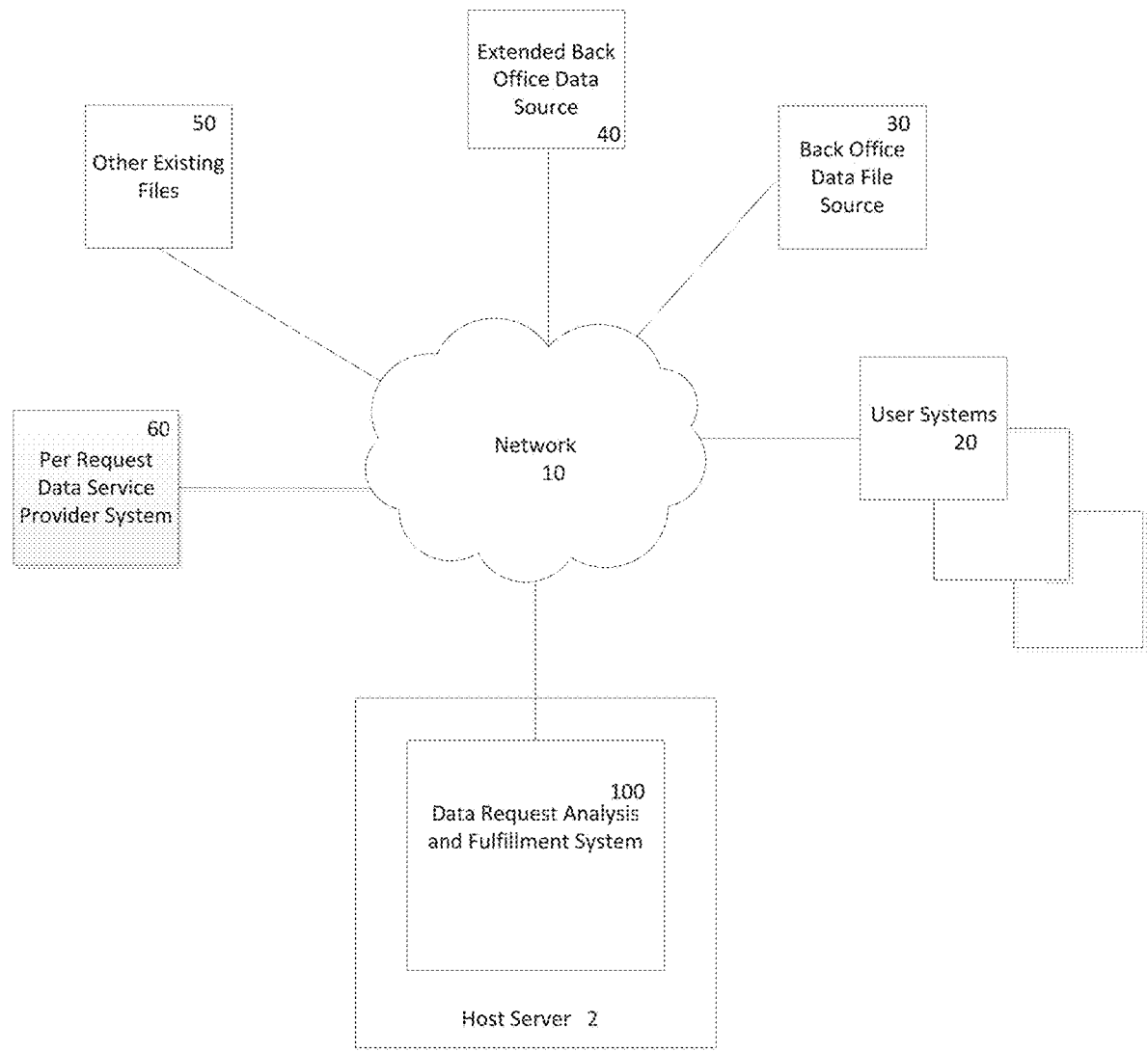
FIG. 1 is a block diagram illustrating an operating environment for a data request analysis and fulfillment system in accordance with an embodiment of the invention.

FIG. 1 is a block diagram illustrating an operating environment for a data request analysis and fulfillment system in accordance with an embodiment of the invention. The operating environment may include multiple components including a host server 2, a data request analysis and fulfillment system 100, user systems 20, back office data file sources 30, extended back office data file sources 40, other existing files 50 and a per request data service 60. All of the items may be connected over a network 10.

The host server 2 may operate and administer multiple organization computing systems and applications for internal corporate and external users. The host server 2 can host web sites, files, images, games and similar content. The host server 2 can be shared among many clients or dedicated to a single client.

The network 10 is preferably the Internet, but may be, or include, other types of networks. Furthermore, even though only one network is shown, multiple networks may be used. The network 2 may include a wired or wireless local area network (LAN) and a wide area network (WAN), wireless personal area network (PAN), and other types of networks. Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa, or other suitable protocol. Furthermore, components of the system may communicate through a combination of wired or wireless paths.

The user systems 20 may include computing systems adapted to view user interfaces, generate requests, and utilize visualizations, reports and recommendations from the data request analysis and fulfillment system 100. User systems 20 may include at least one processor and multiple applications executed by the processor capable of performing desired functions to interact with the data request analysis and fulfillment system 100. The user systems 20, may, for example, include mainframe computers, personal computers, desktop or laptop computing systems and the like. The user systems 20 may include a browser for accessing information provided by the host system 2 and/or data request analysis and fulfillment system 100 and other connected systems that offer such functionality over the Internet or any other network. The user systems 20 may additionally be or include mobile systems, such as smart phones, tablets, or other portable computing apparatus. Mobile client systems may execute downloadable applications for operating in conjunction with the communication data analysis and processing system 100. The downloadable applications may be stored in memory and executed by processors on the mobile systems and may provide a plurality of user interfaces.

Back office data file sources 30 preferably include files described in the background of the invention. As set forth above, these files may be received on a subscription basis from a file source such as Bloomberg™. Similarly, extended back office data file sources 40 may also be received by subscription from the data source and may include additional attributes over the basic back office data file source 30. Other existing files may be maintained in storage 50. In embodiments of the invention, the other existing files 50 may include files delivered by the source system. For example, the other existing files 50 may include per request files delivered within a predetermined existing time-frame. For example, per-request data files may be maintained for twenty four hours prior to discarding and requiring a new data request.

The per request data service provider system 60 may preferably be a source of financial data, such as Bloomberg™, which assesses a fee per data item requested. Those skilled in the art will appreciate that the present application may apply to other similar fulfillment services as well.

The data request analysis and fulfillment system 100 may be operated by an organization monitoring its own resources or by on organization managing resources for multiple client organizations. Details of the data request analysis and fulfillment system 100 are described below with reference to FIGS. 2-5.

Figure 2:
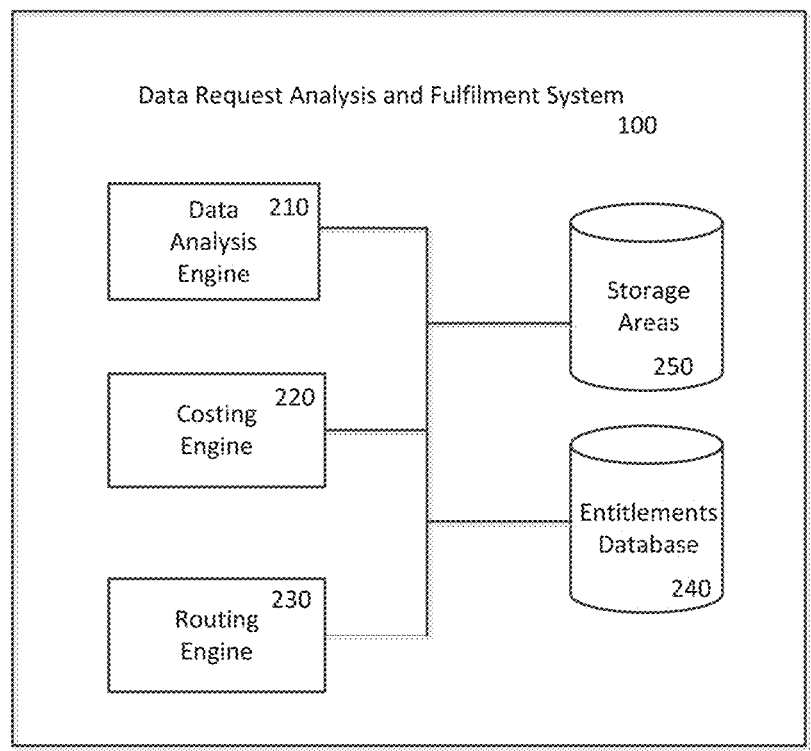
FIG. 2 is a block diagram illustrating components of a data request analysis and fulfillment system in accordance with an embodiment of the invention.

FIG. 2 is a block diagram illustrating components of a data request analysis and fulfillment system in accordance with an embodiment of the invention. The data request analysis and fulfillment system 100 may include storage areas 250 and entitlements database 240. The data request analysis and fulfillment system 100 may further include a data analysis engine 210, a costing engine 220, and a routing engine 230.

The entitlements database 240 may store information and/or rules relating to which files and/or data, including basic back office data, previously fulfilled per request data, and any other files and/or data to which the user is authorized by subscription or otherwise. For example, in an embodiment of the invention, a user may be entitled to access certain Bloomberg™ back office data file source(s) 30, and/or may have previously received a response to a per security request via FTP. It will be appreciated by those skilled in the art however that, through existing services and subscriptions, the entitlements database 240 may refer to types of data other than Bloomberg™ data, or additionally or alternatively, may combine data from a user's various subscriptions, responses, or other entitlements or fulfillment services. The files and/or data may be stored in storage areas 250.

Routing engine 230 interacts with entitlements database 240 and data analysis engine 210 on a continual or intermittent basis each time a request for data is received through the data request analysis and fulfillment system 100. Data analysis engine 210 operates to result in a determination of status as to whether the request can be satisfied using file and/or data available through entitlements database 240. In an embodiment of the invention, the output associated with this determination of status may be, for example, a delta list indicating whether the requested files and/or data exist in whole or in part within entitlements database 240.

If the request is not limited to files and/or data associated with entitlements database 240, in embodiments of the invention, additional expenses may then be incurred on a per-security basis. Where the request is for data that is not covered by the subscription, costing engine 220 may operate to determine the appropriate fees. In an embodiment of the invention, delivery of cost to a user requires the selected price to be approved by an approval component of costing engine 220. However, if the approval component fails to approve the cost, exception processing must be performed prior to delivery of the cost by costing engine 220. Additionally or alternatively, an estimation generation engine may be implemented in conjunction with costing engine 220, through which the user may be provided with a daily, weekly, monthly, etc. cost associated with a certain data request, particularly where the request will be made at regular intervals. Still further, in embodiments of the invention, costing engine 220 may be capable of incorporating cost data associated with retrieving information through entitlements database 240.

Thus, key objectives of data request analysis and fulfillment system 100 include utilization of existing data received from back office files to their maximum benefit, reduction of ancillary requests and realization of cost savings. Furthermore, embodiments of the invention facilitate achievement of these goals in a paperless environment and minimize risk or error by reducing manual input.

Figure 3:
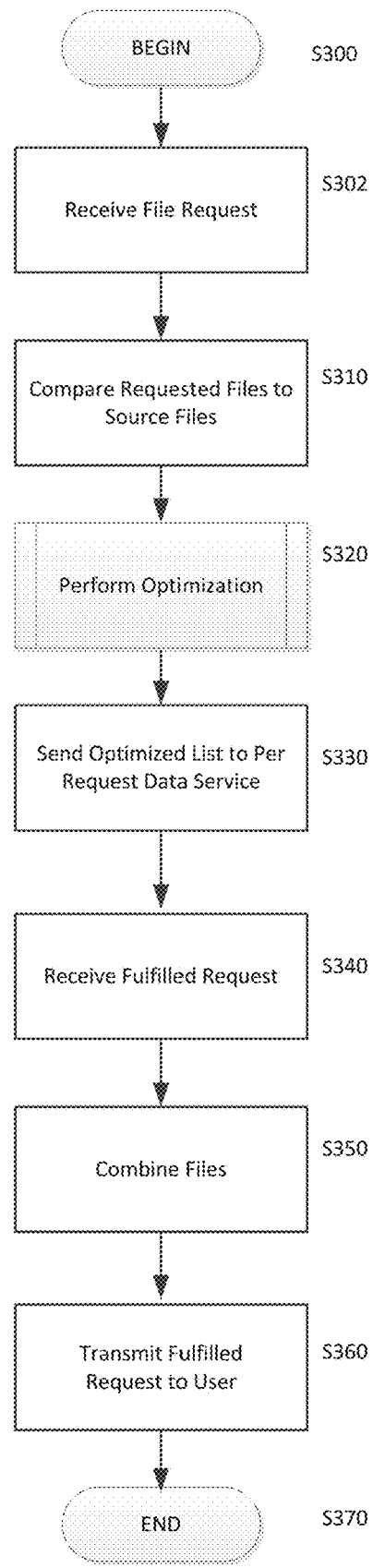
FIG. 3 is a flow chart illustrating operation of a routing engine in accordance with an embodiment of the invention.

FIG. 3 is a flow chart illustrating operation of a routing engine in accordance with an embodiment of the invention. The process begins at S300 with a file request being received via the routing engine at S302. In an embodiment of the invention, this file request may be made, e.g., through the user's per security license, with no knowledge as to whether the responsive files and/or data is already contained in, e.g., the back office files purchased by the user's organization. In S310, the requested files are compared to source files. The source files may comprise a list, rules, or any indication of what files the user may have access to under the appropriate subscription or service, or through any other authorization (e.g., response to previously requested data). A comparison of the requested files to the source files then, will reconcile both sets of files and result in a determination as to the extent of overlap (if any) between them.

In S320, the optimization between the requested files and the source files takes place. The optimization step may result in output such as, e.g., a list, description, and/or any other indication of the reconciliation between the requested files and the source files. In an embodiment of the invention, the optimized list is then sent to a per request data service in S330, ensuring that the only files requested are ones which are not part of the user's source files and/or included in the subscription and/or were the subject of previous request by the user. In an embodiment of the invention, the indication will be a list, table, chart, graph, and/or any other descriptive summary of the data that is emailed to the per request data service. The per request data service fulfills the request at S340, and the fulfilled request is combined with any source files that were part of, or responsive to, the original request at S350. The combined files and/or data are transmitted to the user as a fulfilled request at S360 to complete the process at S370.

Figure 4:
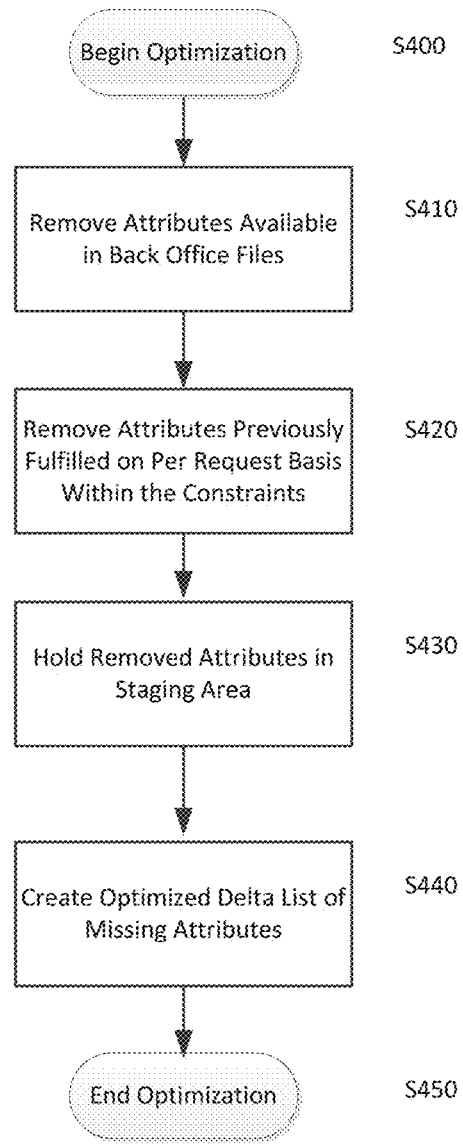
FIG. 4 is a flow chart illustrating an optimization procedure performed by the routing engine in accordance with an embodiment of the invention.

FIG. 4 is a flow chart illustrating an optimization procedure performed by the routing engine in accordance with an embodiment of the invention. In an embodiment of the invention, the optimization process begins at S400 with the reconciliation between requested files and source files, as described in more detail with respect to the exemplary embodiment depicted and described in FIG. 3. In an embodiment of the invention, the routing engine processes the request at a staging area and first removes attributes associated with the request that are available in the back office files at S410. In S420, attributes previously fulfilled on a per request basis, that exist within the requested time constraints, are also removed. The removed attributes are held in the staging area at S430. At S440, an optimized delta list of missing attributes is generated. The optimized delta list may subsequently be forwarded on to the appropriate service, such as Bloomberg™, for processing. Once the optimized delta list is generated and forwarded, this portion of the optimization ends at S450.

FIG. 5 is a work flow diagram illustrating movement of a data request in accordance with an embodiment of the invention. In an embodiment of the invention, after a per security request 500 is made, and e.g., transmitted 502 by a router to database 510, all existing or available attributes may be removed in an optimization process at a staging area 512. In an embodiment of the invention, the optimization process at 504 may include data attributes available as part of the existing Bloomberg™ extended back office raw data files 514. Additionally or alternatively, the optimization process at 560 may also include a second level of optimization which removes data attributes from previously fulfilled per security requests (that is, per security responses 552) that meet the requested timing requirements. The request response data may be stored in or associated with cache location 552.

After optimization, the fulfilled attributes are held in the staging area 512 while a delta list of the missing attributes is created at 522, based on, e.g., specified field categories. The delta list of all attributes falling under that category may be compiled into a per security request at 530 and sent at 532 to, e.g., the Bloomberg™ servers 540 for completion.

Upon receiving a response from the Bloomberg™ servers 540, the completed delta attributes may be "grabbed" at 542 and returned to staging area 512. The fulfilled attributes at the staging area 512, cache location 550 and the Bloomberg™ delta fulfilled attributes are all combined into a single response file and sent to the user at 570. The response file will contain responses to the initial data requirement and may also include billing statistics indicating relating to the data attribute response (if retrieved via per-security).

FIG. 6 is a block diagram illustrating generation of a cost report in accordance with an embodiment of the invention. In an embodiment of the invention, the costing engine 220 will generate a costing report 620 based on the unique hits database 610, shared hits database 612, and the multiple hits database 614. The unique hits database 610 may count, store, and/or capture the initial instrument request raised against the data license account. If the initial instrument request was sent by more than one team within the data license account, the request may be counted, stored, and/or captured in association with shared hits database 612. In embodiments of the invention, this may allow more than one team to divide any cost associated with the request. Further, if a user requests the same initial instrument or data category multiple times within the same day, the request may be counted, stored, and/or captured in association with multiple hits database 614. Costing reports 620 may be grouped by, for example, asset classification or data license category. Those of ordinary skill in the art will appreciate that costing reports 620 may be based on various parameters, including, but not limited to, time and user.

Embodiments of the invention may also allow for costing engine 220 to be deployed at multiple levels within an organization. In embodiments of the invention, it may be desirable to allow for the combination of requests from different levels of the organization, allowing for a single response to be transmitted to two or more requestors seeking access to the same data. Additionally or alternatively, data records may be kept of regularly overlapping requests from two or more levels within an organization. In an embodiment of the invention, these data records may be used to enhance collaboration within the organization.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones, tablets or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as the Macintosh® OS or iOS operating systems, Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Apache™ operating system, an OpenStep™ operating system or another operating system of platform. In other embodiments, the operating system may be or include operating systems specifically adapted for mobile devices, such as the Google Android™ mobile operating system, the Mozilla Firefox™ OS mobile operating system, the RIM BlackBerry™ mobile operating system, the Apple iOS™ mobile operating system, Nokia Symbian™ or S40™ (Series 40) mobile operating systems, Microsoft's Windows Phone™, Windows 8™, or Windows RT™ operating system, the Samsung Bada™ mobile operating system, the Hewlett Packard webOS™ mobile operating system, the Palm OS™ mobile operating system, the Maemo™ mobile operating system, or the MeeGo™ mobile operating system.

At a minimum, the memory includes at least one set of instructions that is either permanently or temporarily stored. The processor executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The computer systems described above may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, Objective C, C++, COBOL, dBase, Forth, FORTRAN, Java, Modula-2, Pascal, Prolog, RUM and/or JavaScript, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or nonremovable memory interface.

The processing unit that executes commands and instructions may be a general purpose computer, but may utilize any of a wide variety of other technologies including a special purpose computer, a microcomputer, mini-computer, mainframe computer, programmed microprocessor, microcontroller, peripheral integrated circuit element, a CSIC (Visitor Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, capacitive and resistive (multi-touch) touch screens, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

While particular embodiments of the invention have been illustrated and described in detail herein, it should be understood that various changes and modifications might be made to the invention without departing from the scope and intent of the invention. From the foregoing it will be seen that this invention is one well adapted to attain all the ends and objects set forth above, together with other advantages, which are obvious and inherent to the systems and methods. It will be understood that certain features and sub-combinations are of utility and may be employed without reference to other features and sub-combinations.

What is claimed is:

1. A method for analyzing and fulfilling a file request within an organization using a data request analysis and fulfillment system, the file request including multiple data items, the method comprising:
   storing data items that include financial data previously purchased via a license in at least one computer memory;
   executing instructions using at least one computer processor for:
      receiving the file request over a network from a system user;
      recording the file request and counting the recorded file request against the license for the system user;
      analyzing the file request to identify data items to be purchased and requested by the file request corresponding to the previously purchased data items;
      creating a delta list by removing the data items to be purchased corresponding to the previously purchased data items from the file request when the corresponding data items and the previously purchased data items are the same;
      sorting the delta list into at least one specified field category based on the data items;
      generating a modified file request based on the delta list;
      determining an estimated cost for the modified file request and displaying the estimated cost based on a predetermined interval;
      transmitting the modified file request for fulfillment to a fulfillment source that includes at least one financial data system;
      receiving a file corresponding to a fulfilled request;
      creating a response file combining the file corresponding to the received file with the data items corresponding to the previously purchased data items; and
      transmitting the response file over the network to the system user.

2. The method of claim 1, wherein the fulfillment source assesses a license cost per requested data item.

3. The method of claim 2, further comprising:
   comparing a license cost of the file request with a license cost of the modified file request based on the delta list; and
   generating a cost savings report based on the comparison.

4. The method of claim 1, further comprising identifying an asset class and data of requested attributes.

5. The method of claim 1, wherein the previously purchased data items are back office files provided based on the license.

6. The method of claim 1, further comprising:
providing a cost analysis of the data request analysis and fulfillment system.

7. The method of claim 1, further comprising:
generating a regular costing report based on usage of the data request analysis and fulfillment system.

8. The method of claim 7, wherein the regular costing report is issued monthly.

9. The method of claim 7, wherein the regular costing report is divided by at least one of the following: unique hits, shared hits, and multiple hits.

10. A system for analyzing and fulfilling a file request within an organization, the file request including multiple data items, the system comprising:
data items that include financial data previously purchased via a license and stored on at least one computer memory;
at least one computer processor for receiving the file request over a network from a system user, recording the file request and counting the recorded file request against the license for the system user, and analyzing the file request to identify data items to be purchased and requested by the file request corresponding to the previously purchased data items;
the at least one computer processor further configured to cleanse the file request by
creating a delta list removing the data items to be purchased corresponding to the previously purchased data items when the corresponding data items and the previously purchased data items are the same,
sorting the delta list into at least one specified field category based on the data items,
generating a modified file request based on the delta list, and
determining an estimated cost for the modified file request and displaying the estimated cost based on a predetermined interval; and
a network for transmitting the cleansed file request for fulfillment to a fulfillment source that includes at least one financial data system;
wherein, upon receiving a file corresponding to the fulfilled file request, the at least one computer processor is operable to create a response file combining the file corresponding to the fulfilled file request with the data items corresponding to the previously purchased data items.

11. The system of claim 10, wherein the fulfillment source assesses a license cost per requested data item.

12. The system of claim 11, further comprising comparing a license cost of the file request with a license cost of the cleansed file request and generating a cost savings report.

13. The system of claim 10, wherein the previously purchased data items are back office files provided based on the license.

14. The system of claim 10, wherein the at least one computer processor is further configured to provide a cost benefit analysis of the data request analysis and fulfillment system.

15. The system of claim 10, wherein the at least one computer processor is further configured to generate a regular costing report based on usage of the data request analysis and fulfillment system.

16. The system of claim 15, wherein the regular costing report is issued monthly.

17. The system of claim 15, wherein the regular costing report is divided by at least one of the following: unique hits, shared hits, and multiple hits.

18. A method for sharing costs of fulfilling a file request within an organization, the file request including multiple data items, the method comprising:
storing data items that include financial data previously purchased via a license in at least one shared computer memory;
executing instructions using at least one computer processor for performing steps including:
receiving a first file request over a network from a first system user associated with a first level of the organization;
recording the first file request and counting the recorded first file request against the license for the first system user;
analyzing the first file request to identify data items to be purchased and requested by the first file request corresponding to the previously purchased data items;
receiving a second file request over the network from a second system user associated with a second level of the organization;
recording the second file request and counting the recorded second file request against the license for the second system user;
analyzing the second file request to identify data items requested by the second file request;
generating a usage report comprising a list of items identified as requested by both the first and second requests to determine whether the second system user from the second level of the organization has made an overlapping request;
creating a delta list by removing the data items to be purchased corresponding to the previously purchased data items from the first file request when the corresponding data items and the previously purchased data items are the same;
sorting the delta list into at least one specified field category based on the data items;
generating a modified request based on the delta list;
determining an estimated cost for the modified file request and displaying the estimated cost based on a predetermined interval;
transmitting the modified request for fulfillment to a fulfillment source that includes at least one financial data system;
receiving a file corresponding to the fulfilled modified request;
creating a response file combining the file corresponding to the fulfilled modified request with the data items corresponding to the previously purchased data items;
transmitting the response file to the first system user;
transmitting the response file to the second system user; and
dividing a cost associated with the response file between the first and second levels of the organization.

19. The method of claim 1, wherein the previously purchased data items are included in the delta list if delivered earlier than a desired time frame.

* * * * *